United States Patent [19]

Fuldner et al.

[11] Patent Number: 4,684,084
[45] Date of Patent: Aug. 4, 1987

[54] SPACECRAFT STRUCTURE WITH SYMMETRICAL MASS CENTER AND ASYMMETRICAL DEPLOYABLE APPENDAGES

[75] Inventors: William V. Fuldner, Lower Makefield Township, Morrisville County, Pa.; Eugene R. Ganssle, Skillman, N.J.

[73] Assignee: RCA Corporation, Princeton, N.J.

[21] Appl. No.: 614,618

[22] Filed: May 29, 1984

[51] Int. Cl.⁴ .............................................. B64G 1/24
[52] U.S. Cl. ................................ 244/168; 244/158 R; 244/172; 244/173
[58] Field of Search ................... 244/158 R, 164, 168, 244/169, 172, 173

[56] References Cited

U.S. PATENT DOCUMENTS

| | | | |
|---|---|---|---|
| 3,206,141 | 9/1965 | Dryden | 244/169 |
| 3,516,623 | 6/1970 | Sinden | 244/169 |
| 4,133,502 | 1/1979 | Anchutin | 244/173 |
| 4,262,867 | 4/1981 | Piening | 244/168 |
| 4,325,124 | 4/1982 | Renner | 364/459 |
| 4,345,728 | 8/1982 | Neufeld | 244/168 |

OTHER PUBLICATIONS

"Where Do We Stand on Attitude Control", Robert E. Roberson, *Aviation Age R & D Handbook*, pp. B5-B10, 1958-1959.

Primary Examiner—Trygve M. Blix
Assistant Examiner—Rodney Corl
Attorney, Agent, or Firm—Clement A. Berard, Jr.; Robert L. Troike

[57] ABSTRACT

An orbiting satellite system includes an asymmetrically deployed antenna and two deployable solar cell arrays. The solar cell arrays are deployed to a location which compensates for the asymmetry of the antenna so that the resulting station keeping thruster torques balance. Also, the system surfaces may be configured and the arrays so deployed to balance solar pressure torques on the system.

7 Claims, 8 Drawing Figures

U.S. Patent   Aug. 4, 1987   Sheet 1 of 3   4,684,084
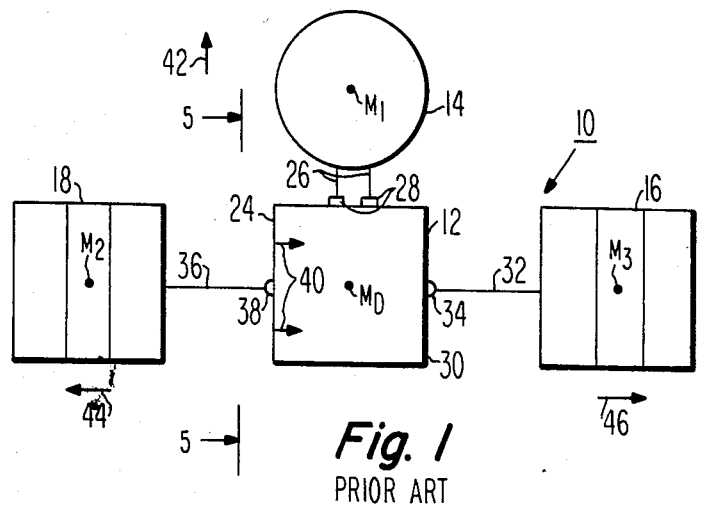
Fig. 1
PRIOR ART
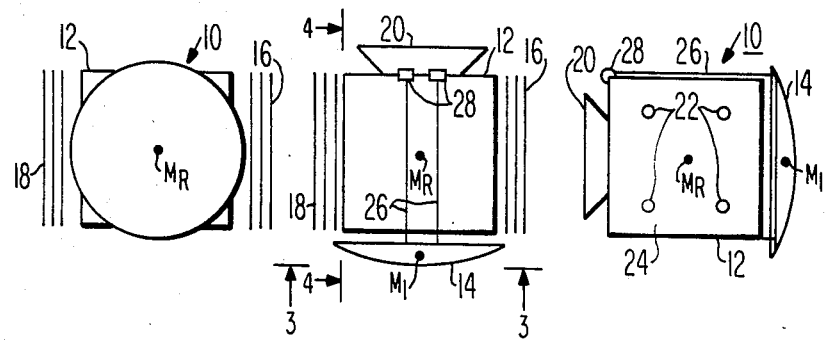
Fig. 3
PRIOR ART
Fig. 2
PRIOR ART
Fig. 4
PRIOR ART
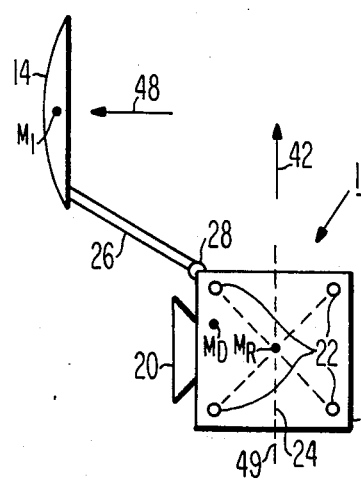
Fig. 5
PRIOR ART

SPACECRAFT STRUCTURE WITH SYMMETRICAL MASS CENTER AND ASYMMETRICAL DEPLOYABLE APPENDAGES

This invention relates to spacecraft structures including deployable antennas and solar array structures, and more particularly, to apparatus for stabilizing such structures.

Spacecraft, typically communication satellites, but others as well, require relatively large appendages such as antennas and solar cell arrays to perform their missions. These spacecraft during a launch mode are compactly housed to satisfy volumetric limits of a given launch vehicle. These limits require that the appendages be attached to the main spacecraft body with articulated linkage so that they may be retracted during launch and later deployed when the spacecraft is in its operating position, for example, during earth orbit.

The deployment of asymmetrical appendages in the weightless environment of space often produces an undesirable shift in the center of mass of the spacecraft system. Such appendages also tend to have deployed areas and surface conditions which are asymmetrical relative to each other and solar pressures which are likely to also cause undesired attitude disturbance torques on the spacecraft.

A problem with the center of mass shifts is that such shifts often result in excessive consumption of propellant to maintain the spacecraft in its desired attitude. For example, a communications satellite antenna needs to be accurately pointed and that pointing needs to be maintained for the life of the spacecraft. The asymmetrical location of the system center of mass relative to certain loads tends to cause the spacecraft to move from the desired orientation in the presence of those loads which may be from different sources, e.g., operation of thrusters during station keeping tasks and response to solar pressures reacting with the various surfaces. In the station keeping mode, excessive consumption of propellant occurs in those spacecraft whose orbital parameters including inclination, ellipticity, period, longitude, among others, are required to be controlled within specified limits. If the center of mass shift is sufficiently large relative to the station keeping thrust vector, it may, in certain implementations, become difficult or even impossible to maintain the pointing accuracy of the spacecraft. In respect of solar pressures, the excessive consumption of propellant may become necessary to compensate for undesirable solar pressure torques induced by the asymmetrical loads created by the various solar pressure response characteristics of the different surfaces of the appendages and the spacecraft body.

Prior art systems have resolved the problem of the center of mass shift by employing additional mechanisms or weights in the spacecraft to shift the center of mass to the more desirable location. These additional mechanisms and weights, however, take up additional space or use additional energy, including propellant, which is undesirable. Such additional mechanisms and weights also tend to reduce the payload capacity of a given spacecraft.

The present inventors have realized that appendages deployed in asymmetrical spaced relationship are the primary cause of the shift in the mass center of the system. According to the present invention, they have realized that such appendages can also be employed to resolve the problem of mass center shift while minimizing the need for significant additional mechanisms or weights.

According to one embodiment of the present invention, a spacecraft includes a body and a deployable antenna attached to the body. This antenna has a retracted mode and a deployed mode in which the antenna is asymmetrical relative to the body. The spacecraft also includes a deployable solar cell array attached to the body and having retracted and deployed modes. The body, retracted antenna and retracted solar array have a combined mass center at a first location relative to the body. The antenna in its deployed mode tends to reposition the system's mass center to a location different than the mass center in the retracted mode. The improvement herein comprises a solar array extending means adapted to deploy the solar array to a position relative to the body in which the system mass center is at a third location so that moments created by said deployed antenna and deployed solar array are balanced relative to forces applied to said system in at least one direction. In the drawing:

FIG. 1 is a front elevation view of a prior art spacecraft system, in schematic form, employing a deployable antenna and deployable solar arrays;

FIG. 2 is a plan view of the system of FIG. 1 with the solar arrays and antenna in a retracted launch mode;

FIG. 3 is a front elevation view of the system of FIG. 2 taken along lines 3—3;

FIG. 4 is a sectional side elevation view of the system of FIG. 2 taken along lines 4—4;

FIG. 5 is a side elevation sectional view of the system of FIG. 1 taken along lines 5—5;

Figure 6:
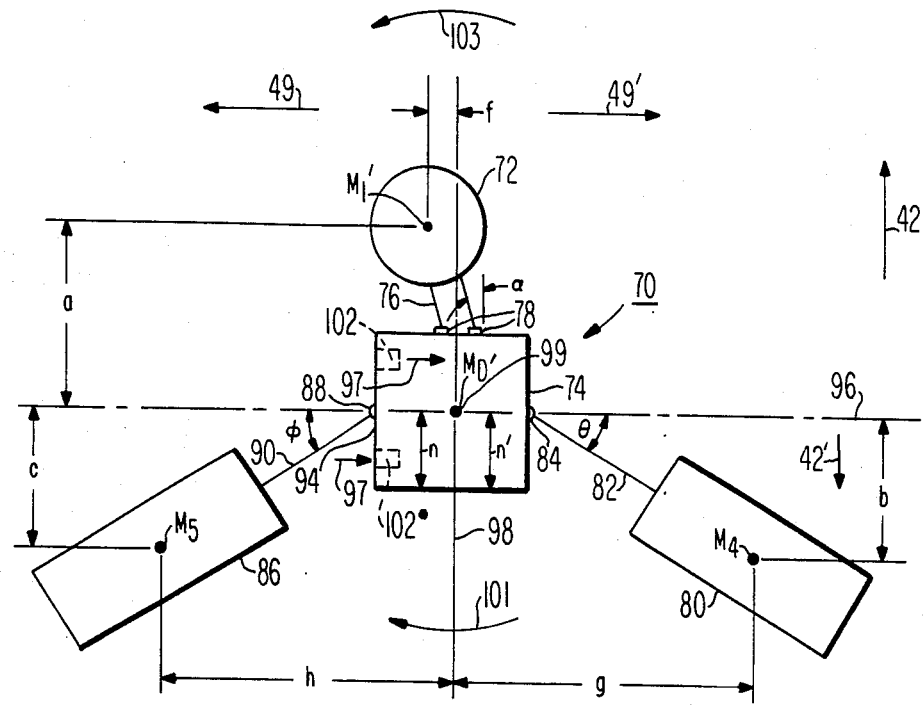
FIGS. 6 and 8 are front and side elevation views, respectively, of a spacecraft structure, in schematic form, according to one embodiment of the present invention with its antenna and solar arrays deployed.

In FIG. 1, prior art spacecraft system 10 includes a spacecraft body 12 with a deployed communications antenna 14 and deployed solar array panels 16 and 18. The panels 16, 18 each comprise a number of hinged sections which fold over one another in a known way when retracted. The body 12 includes various apparatuses (not shown) typically employed in a communications satellite. The apparatuses may include engines, control systems, payload and other equipment necessary to operate the satellite during its orbiting mission, including station keeping and pointing equipment for aiming the antenna 14 toward a given location on the earth. The antenna 14 and panels 16, 18 are deployed from the retracted, folded configuration shown in FIGS. 2, 3 and 4 to the orientation of FIG. 1 after the spacecraft system 10 reaches its earth orbiting or operational position.

When in that position it is expected the system will orbit the earth without the need for significant engine activity. That is, the system is intended to orbit passively. In practice, however, such passive operation needs occasional correction due to external forces on the system. Such correction requires the use of so-called station keeping thrusters 22. Even the operation of such thrusters can produce problems, as will be explained later. The present invention is intended to minimize the need for such occasional corrective station keeping activity and also to minimize excessive propellant consumption which may otherwise occur during such corrective station keeping activity.

Struts 26, FIG. 1, pivotally secure antenna 14 to the body 12 via hinges 28. The solar panel 16 is rotatably secured to side 30 of the body 12 by articulated linkage 32 and hinge 34. The solar panel 18 is rotatably secured to side 24 by articulated linkage 36 and hinge 38. Mechanisms (not shown) automatically position the deployable elements such as antenna 14 and panels 16, 18 to the desired deployed orientation. Such mechanisms can include, for example, spring loaded hinges which are stressed when the elements are retracted, the elements being restrained from unfolding by retaining devices. When the retaining devices holding the elements are released, the spring loaded hinges force the elements to their deployed position.

In FIGS. 2 and 4, apogee kick motor 20 is attached to the body 12 for positioning the spacecraft system 10 in its desired orbit altitude. A symmetrical array of four station keeping thrusters 22 are located on a side 24 of the body 12. In FIG. 1, the thrusters 22 (not shown) when all operated simultaneously, create a symmetrical array of forces 40 which provide a combined thrust vector which is intended to propel the system 10 in direction 46. The thrusters 22 may also be selectively individually operated. The thrusters 22 have a relatively small supply of propellant and are employed, among other mechanisms such as gyros and the like, for station keeping purposes for pointing the antenna 14 at the desired location on earth. The thrusters 22 need to be employed when external forces applied against the system 10 tend to displace the system 10 from its desired orientation during orbit. Such forces include solar pressures which act on extended solar array panels 16, 18, on antenna 14, and on body 12, FIG. 1. When the thrusters 22 are operated, however, the asymmetry of the system mass center $M_d$ to those thruster forces 40 will tend to move the system in an undesired direction.

For example, in FIG. 1, the antenna 14 mass center $M_1$ is located spaced from the body 12, in direction 42. Panel 18 mass center $M_2$ is located on one side of and spaced from the body 12 in direction 44 normal to direction 42. The panel 16 mass center $M_3$ is symmetrically located diametrically opposite the mass center $M_2$ relative to the spacecraft body 12.

In FIG. 4, the system 10 retracted mass center $M_R$ during launch is somewhat centrally located due to the retracted conditions of the solar panels 16, 18, and antenna 14. That mass center $M_R$ for purposes of discussion is assumed symmetrically located relative to the array of forces 40 created by all thrusters 22, in directions 46, FIG. 1, so that the combined thruster vector on a retracted system coincides with the system mass center. However, in FIG. 5, after deployment, the antenna 14 mass center $M_1$ is asymmetrically displaced in orthogonal directions 42 and 48 relative to the location of the retracted system mass center $M_R$. This asymmetrical deployment of the antenna 14 mass center $M_1$ tends to asymmetrically displace the mass center $M_D$ of the deployed system relative to the array of forces 40, FIG. 1.

In FIG. 5, the dashed line 49 represents the position of the deployed panels 16 and 18 of FIG. 1 which are symmetrical relative to mass center $M_R$. The panels 16 and 18 mass centers $M_3$, $M_2$, respectively, lie generally on a line (not shown) passing through the mass center $M_R$. Therefore, the system mass center $M_D$ location is not significantly affected by such symmetrical deployment of prior art solar panels. It is primarily the deployed antenna 14 which tends to relocate the system mass center $M_D$ in directions 42 and 48, FIG. 5. That displacement is sufficient to cause station keeping problems when the array of thrusters 22 is operated to move the system in direction 46, FIG. 1, unless otherwise compensated for.

That is, because mass center $M_D$ is asymmetrical relative to those thruster generated forces, unbalanced moments are created such that the system 10 tends to move in undesired directions, requiring other stabilizing mechanisms (not shown) to reorient the system, as described. Further, the asymmetry of the areas of antenna 14 and panels 16, 18 relative to solar pressures can also result in undesirable solar pressure torques which tend to misorient the system during its orbiting mission. This may require operating thrusters 22 which tends to create the asymmetrical thruster load problem described above, further complicating the station keeping operation.

Figure 8:
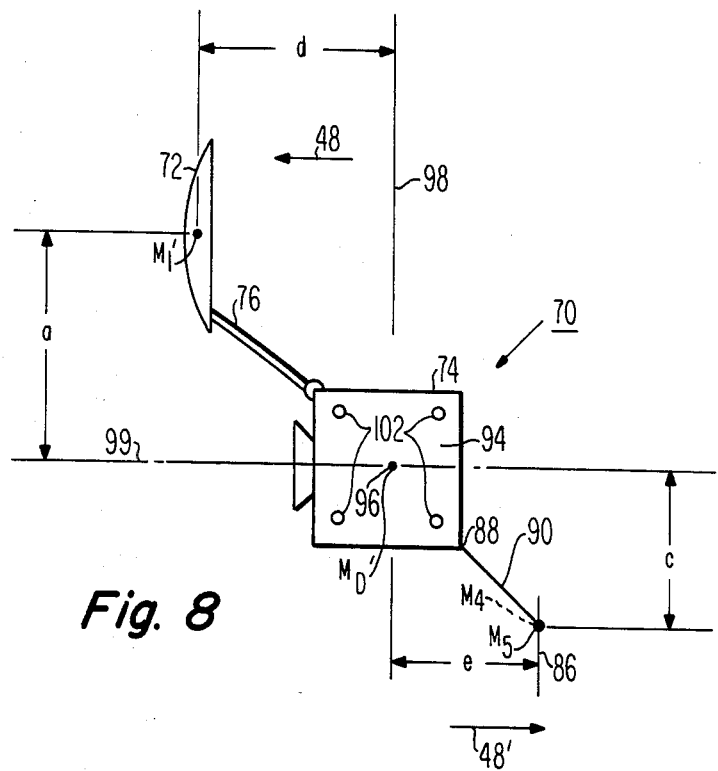

In FIGS. 6 and 8, a spacecraft system 70 according to one embodiment of the present invention is shown in an orthogonal system in which diametrically opposite directions 49, 49', FIG. 6, are normal to diametrically opposite directions 48, 48', FIG. 8. This system 70 includes an antenna 72 deployed so that its mass center $M_1'$ is spaced a distance, a, in direction 42 from the plane formed by orthogonal, intersecting axes 96, 99 of the spacecraft body 74. Axes 96, 99 are parallel, respectively, to directions 49, 49' and 48, 48' and pass through the mass center $M_D'$ of the deployed system. A third axis 98 is orthogonal to both axes 96 and 99. Struts 76 attach antenna 72 to body 74 via hinges 78. In the general case, the antenna 72 may also be deployed with its mass center $M_1'$ offset a distance f in direction 49 from a first plane normal to the drawing sheet in which axes 98 and 99 and mass center $M_D'$ lie. Distance f is created by struts 76 being deployed at a projected angle $\alpha$ relative to the first plane (the struts also extend away from body 74 as shown in FIG. 8). In FIG. 8, antenna 72 mass center $M_1'$ is spaced a distance d in direction 48 from a second plane in which axes 96 and 98 lie and which is normal to axis 99.

Articulated linkage 82, FIG. 6, attaches solar panel 80 to one side of body 74 via hinge 84. Articulated linkage 90 attaches panel 86 to a second opposite side of body 74 via hinge 88. The hinges 84 and 88 may be located on axis 96.

In FIG. 6, panel 80 has a mass center $M_4$ and panel 86 has a mass center $M_5$. The panels are shown as a single element but each may be a plurality of panel sections hinged together. Mass center $M_4$ is spaced a distance b in direction 42' normal to a third plane in which axes 96, 99 lie. A line passing through mass center $M_4$ and the axis of rotation of hinge 84 is at a projected angle $\theta$ relative to that third plane. Mass center $M_5$ is spaced a distance c, in direction 42', from the third plane. A line passing through panel 86 mass center $M_5$ and the axis of rotation of hinge 88 is at a projected angle $\phi$ relative to that third plane. The distances b and c may be different or the same, as will be explained.

Mass center $M_4$ is spaced a distance g in direction 49' from and normal to the first plane in which axis 99 lies. Mass center $M_5$ is spaced a distance h direction 49 from the first plane. Mass centers $M_4$ and $M_5$ are spaced a distance e, FIG. 8, direction 48' from the second plane. These mass center spacings tend to place the system's deployed mass center $M_D'$ at the intersection of axes 96, 98 and 99. Thus, $M_D'$ is symmetrical relative to an array of four thrusters 102 which are arranged to create an array of forces 97, FIG. 6, in directions 49' parallel and symmetrical relative to axis 96.

To balance the moments created by the system 70 in outerspace, FIG. 6, it is apparent that the combined respective moments $M_4b$ and $M_5c$ of panels 80, 86 about axis 99 (in direction 101) should be the same in magnitude and opposite in sense as the moment $M_1'a$ of antenna 72 (in direction 103), the axis 99 passing through mass center $M_D'$, as described above. When thrusters 102 fire to produce the array of forces 97 in direction 49', FIG. 6, the panels 80, 86 tend to produce clockwise moments $M_4b$, $M_5c$, respectively, in direction 101 about axis 99. The clockwise moments tend to counterbalance the counterclockwise moment $M_1'a$ produced by antenna 72, since the combined force vector of the array of thrusters 102 is assumed passing through axis 99, and thus system mass center $M_D'$. The counterbalanced torques tend to preclude the system 70 from moving in directions other than the intended directions 97, FIG. 6. Thus, the moments produced by the masses $M_4$, $M_5$, of the two panels 80, 86 form a composite moment which is the same in magnitude and opposite in sense to the moment created by the offset mass $M_1'$ of antenna 72 relative to axis 99 when the system is moved by symmetrical forces 97 direction 49'. The body 74 does not contribute to any asymmetrical moments when the array of thrusters 102 are operated because their force vector passes through the body 74 or system mass center $M_D'$.

The distances b and c may be chosen to be the same or different for this purpose. In a symmetrical spacecraft system, the moment of panel 80 may be the same as the moment of panel 86 relative to axis 99 in direction 101 and to retain that symmetry, the distances b and c in direction 42' are made equal, assuming the panels 80, 86 are equal in mass. However, the symmetry of the separate moments of panels 80, 86 is not mandatory, only that the sum of the moments of the panels 80, 86 be equal and opposite to the moment produced by the antenna 72 relative to axis 99, FIG. 8, in response to the operation of the thruster array.

The moments of the mass centers of the antenna 72 and panels 80, 86 relative to axis 96, FIG. 8, can also be made the same to balance solar pressure torques on the respective surface areas. Thus, in FIG. 8, moments $M_5c + M_4c$ should be the same as $M_1'a$, where c is the spacing in direction 42' of solar pressure centers $M_4$ and $M_5$ (assuming now $M_4$, $M_5$ and $M_1'$ are the solar pressure force centers rather than "mass centers") from the third plane and a is the spacing in direction 42 of solar pressure center $M_1'$ from that third plane. These solar pressure moments rotate about axis 96. Further, to balance the system about axis 98 through solar pressure center $M_D'$ normal to and intersecting axes 96, 99 would require the solar pressure caused moment $M_4g$, FIG. 6, to be about the same in magnitude but opposite in sense as the solar pressure caused moments $M_5h + M_1'f$ to preclude rotation of the system about that axis 98. The above solar pressure moments also would require consideration of the reactions of the surfaces of the antenna and panels to solar pressures. In any event, the combined mass center moments of the panels 80, 86 would generally be considered first over solar pressure center moments due to the relatively greater forces created by thrusters 102 as compared to solar pressure forces.

While some compensation for solar pressure torques may be achieved by the mechanical symmetry of the system in certain orientations, e.g., (assuming the sun is on axis 99, FIG. 6), this compensation may vary with time in the orbit as the solar vector moves about the spacecraft. The compensation also varies with seasonal changes in solar declination which also moves the solar vector relative to the spacecraft and, therefore, is more complex than the thruster created forces. The system of FIGS. 6 and 8 readily compensates for thruster forces 97 in a symmetrical array relative to mass center $M_D'$ in directions 49'. The panels 80, 86 and antenna 72 in FIG. 8 are thus located to produce a system mass center which is located symmetrical relative to the location of the thrusters 102 forces 97 so that the resulting thruster exhaust pressures (even though relatively small) do not produce disruptive torques. Such thrusters are typically located only on one side 94 of the spacecraft body 74. The system 70 of FIG. 8 thus tends to preclude unbalancing torques created by those thrusters when operated in an array.

Figure 7:
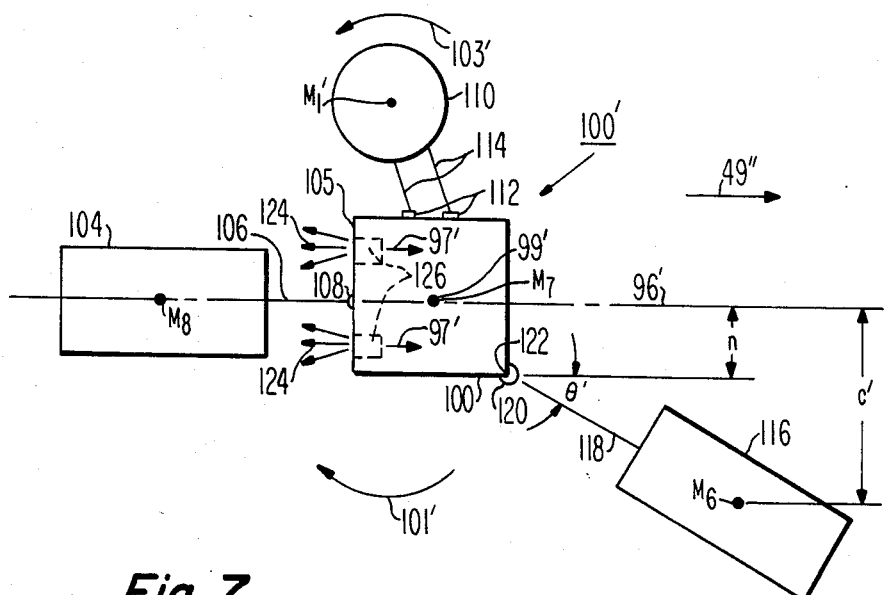
FIG. 7 is a front elevation view of a second embodiment of a spacecraft structure in schematic form with its antenna and solar arrays deployed.

If it is desired to minimize the angle $\theta$ or $\phi$, FIG. 6, to maintain symmetrical thruster plume impingement on one panel of the solar array, e.g., panel 86, and to simplify deployment of that panel of the array, the hinge 88 and the linkage 90 for the panel 86 can be repositioned as shown in the system of FIG. 7. In FIG. 7, spacecraft system 100' body 100 has a side 105 from which solar array panel 104 extends via linkage 106 hinged by hinge 108. Antenna 110 is attached to the body 100 by hinges 112 and struts 114. A second solar cell panel 116 is supported by linkage 118 attached by hinge 120 at edge 122 of the body 100.

By placing the hinge 120 at the edge 122, the hinge 120 is displaced distance n from the position of hinge 84 in system 70, FIG. 6. The mass center $M_6$ of the panel 116 thus is displaced distance n from the third plane defined by axes 96', 99' passing through the mass center $M_7$ of the deployed system 100'. Because of this, the angle $\theta'$ of the linkage 118 to axis 96' may be made smaller (more acute) than the corresponding angle $\theta$ of the embodiment of FIG. 6. This spaces the mass center $M_6$ the desired distance c' from the second plane.

The embodiment of FIG. 7 thus takes advantage of the overall dimensions of the spacecraft body 100 to create a mass offsetting distance similar to distance c of the system of FIG. 6. The panel 104 may be located with its mass center $M_8$ located on axis 96'. In this case, the panel 104 creates no significant moments about axis 99' (normal to axis 96') in response to the array of thruster forces 97'. Therefore, the panel 116 mass displacement c' can compensate for the moment of antenna 110 about axis 99' direction 103' in response to forces 97' created by the thrusters 126, direction 49''. In this case, it is assumed that the moment of the panel 116 mass center is sufficient for this purpose.

The thrusters 126 are located on side 105 and produce plumes 124. The panel 104 is symmetrical relative to the plumes 124 and, thus, the resultant torques produced by those plumes if they impinge on the panel 104, tend to be balanced. Other moments relative to the combined mass center can be balanced by selective design of the magnitude of the areas and masses and locating the masses of the panels 116 and antenna 110 strategically in the system for balancing the resulting torques, as discussed above.

The panels 104 and 116, FIG. 7, may be reoriented or reconfigured in outline shape to take advantage of different resulting solar pressures that may be developed in a given implementation. The surface areas and the orientation of those surface areas as well as the torques created by those surface areas relative to the spacecraft body 100 may be predetermined. Such torques are a function of a given set of solar pressures that may be applied to the system. When desired, the system should be designed to make such solar pressure-created torques symmetrical relative to the spacecraft system. Thus, while the systems of FIGS. 6-8 have addressed center of mass control, center of pressure control can be accomplished by similar techniques where the governing geometries may utilize terms corresponding to effective areas and surface finishes of the different masses in place of the mass center terms. The former terms would be utilized where the pressures and the resulting torques are more paramount than the relocation of the mass centers in a given implementation.

The moments produced by the respective panels 80, 86, of the system 70 of FIG. 6 may be the same or different, the distances b and c may be the same or different, the angles $\theta$ and $\phi$ may be the same or different, the distances n, n' from the edge of the spacecraft body 74, FIG. 6, to a line parallel to line 96 through the hinges 88, 84 of the respective panels 86, 80 may be the same or different, and the antenna tilt angle $\alpha$, FIG. 6, may be zero or some finite value.

The panels 80, 86 of FIG. 6 or panels 104, 116 of FIG. 7 may be oriented either symmetrically or asymmetrically relative to the respective spacecraft body in accordance with a given implementation. More or fewer panels may be used in such an implementation. What is important is that the panels be deployed and configured to locate the center of mass of the system symmetrically relative to thruster forces or solar pressure forces on the spacecraft system so that moments created by the thrusters or the torques created by the solar pressures on the system balance.

What is claimed is:

1. In a spacecraft system including a spacecraft body, engine drive means including station keeping means for maintaining said system in a given operating orientation, payload and operating means, a deployable antenna having a retracted launch mode and a deployed mode when the spacecraft system is in an operating position in space, solar cell array means including at least one deployable solar cell array, said array having a retracted launch mode and a deployed mode when the system is in its operating position, the mass center of said spacecraft including all said means when in the launch mode having a given first location relative to said body, said mass center tending to relocate to a second undesirable location upon deployment of said antenna and said solar array, the improvement therein comprising means for deploying said at least one solar cell array to an orientation which locates the mass center of said deployed, operating spacecraft system substantially symmetrically relative to forces applied to said system in a given direction when in said operating position.

2. The system of claim 1 wherein said drive means includes means to apply said forces for moving said system in said given direction when in said operating position.

3. The system of claim 1 wherein said array, antenna, and body have surfaces exposed to and responsive to solar energy incident thereon, said energy tending to create solar pressures on said spacecraft, said system including means adapted to deploy said at least one solar array to substantially balance the torques produced by said solar pressures on said operating spacecraft system.

4. In a spacecraft system including a body, a deployable antenna attached to the body and having a retracted mode and a deployed mode asymmetrical relative to said body, deployable solar cell array means attached to the body and having retracted and deployed modes, said body, retracted antenna and retracted solar array means having a combined mass center at a first location relative to said body, said deployed antenna tending to reposition the system mass center to a location different than said first location, the improvement therewith including solar array extending means adapted to deploy said solar array means to a position relative to said body for placing said system mass center at a third location in the presence of said deployed asymmetrical antenna for balancing the moments created by said deployed antenna and said deployed solar array means relative to forces applied to said system in at least one direction.

5. The system of claim 4 wherein said solar cell array means includes at least two different arrays, said structure including means adapted to deploy said two different arrays in asymmetrical relative orientations to balance said moments of said antenna and said arrays.

6. The system of claim 4 wherein said body has a plurality of peripheral surfaces, said solar array means including means for attaching said solar array means asymmetrical relative to at least one of said surfaces to balance the moments created by solar pressures on said surfaces.

7. The system of claim 4 wherein said system includes means adapted to arrange said antenna and solar cell array means to create solar pressure torques on said system of a given magnitude and direction to balance the moments created by those solar pressures.

* * * * *